United States Patent
Redmond et al.

(10) Patent No.: US 12,171,378 B2
(45) Date of Patent: Dec. 24, 2024

(54) SYSTEMS AND METHODS FOR MONITORING TOILET PAPER ROLLS

(71) Applicant: 7-Eleven, Inc., Irving, TX (US)

(72) Inventors: Matthew O'Daniel Redmond, Denton, TX (US); John Robert Keller, Plano, TX (US)

(73) Assignee: 7-ELEVEN, INC., Irving, TX (US)

( * ) Notice: Subject to any disclaimer, the term of this patent is extended or adjusted under 35 U.S.C. 154(b) by 517 days.

(21) Appl. No.: 17/455,859

(22) Filed: Nov. 19, 2021

(65) Prior Publication Data

US 2023/0157490 A1 May 25, 2023

(51) Int. Cl.
*A47K 10/32* (2006.01)
*G01B 11/02* (2006.01)

(52) U.S. Cl.
CPC ............ *A47K 10/32* (2013.01); *G01B 11/026* (2013.01); *A47K 2010/3226* (2013.01)

(58) Field of Classification Search
CPC .. A47K 10/32; G01B 11/026; G01B 11/0683; G01B 21/16; G01B 11/08; B65H 16/005
See application file for complete search history.

(56) References Cited

U.S. PATENT DOCUMENTS

| | | | |
|---|---|---|---|
| 2005/0167541 A1* | 8/2005 | Osborne | B65H 16/106 242/563 |
| 2015/0102048 A1* | 4/2015 | Case | A47K 10/42 221/1 |
| 2018/0263435 A1* | 9/2018 | Osborne, Jr. | B65H 35/006 |
| 2019/0208967 A1* | 7/2019 | Williams, Jr. | A47K 10/3662 |
| 2020/0022540 A1* | 1/2020 | Mogadati | G01B 21/08 |
| 2024/0008693 A1* | 1/2024 | Adams | A47K 10/32 |

* cited by examiner

*Primary Examiner* — Mirza F Alam
(74) *Attorney, Agent, or Firm* — Baker Botts L.L.P.

(57) ABSTRACT

A system includes a local device and a remote computing system. The local device is disposed in a toilet paper dispenser and includes a sensor and a first processor. The sensor is configured to measure a distance to a toilet paper roll. The first processor is configured to calculate, using the measured distance to the toilet paper roll, a percentage of toilet paper remaining on the toilet paper roll. The first processor is further configured to transmit, when it is determined that the percentage of toilet paper remaining is less than a minimum threshold, sensor data across a wireless communications network. The remote computing system includes a second processor configured to receive the sensor data and send an alert for display on a user device in response to receiving the sensor data.

18 Claims, 3 Drawing Sheets

SYSTEMS AND METHODS FOR MONITORING TOILET PAPER ROLLS

TECHNICAL FIELD

The present disclosure relates generally to sensors, and more specifically to systems and methods for monitoring toilet paper rolls.

BACKGROUND

Toilet paper dispensers are utilized by most businesses such as convenience stores. Toilet paper dispensers store and dispense one or more rolls of toilet paper. Due to the configuration of most toilet paper dispensers, it may be difficult or otherwise time consuming for workers to determine how much toilet paper is remaining on toilet paper rolls disposed inside a toilet paper dispenser.

SUMMARY

Toilet paper dispensers are utilized by most businesses such as convenience stores. Toilet paper dispensers store and dispense one or more rolls of toilet paper. Due to the configuration of most toilet paper dispensers, it may be difficult or otherwise time consuming for workers to determine how much toilet paper is remaining on toilet paper rolls disposed inside a toilet paper dispenser.

To address these and other problems associated with toilet paper rolls and dispensers, this disclosure contemplates measuring a toilet paper roll with a sensor, such as a time-of-flight (ToF) sensor, in order to determine how much toilet paper is remaining on the roll and then creating an alert for display on a user device based on the amount of toilet paper remaining. In one example, an alert may be displayed on a user device when a measured percentage of toilet paper remaining on a toilet paper roll is below a predetermined minimum threshold (e.g., less than 10% of the roll remaining). In another example, an alert may be displayed on a user device when it is determined that the difference between a current amount of toilet paper on a toilet paper roll and a previous amount of toilet paper on the toilet paper roll exceeds a threshold amount of change in toilet paper (e.g., the amount of toilet paper on the roll decreased by more than 60% from the previous measurement). As a result, workers in businesses such as convenience stores may be automatically notified when a toilet paper roll needs to be changed, thereby increasing worker productivity and increasing customer satisfaction. Furthermore, by monitoring toilet paper consumption over time, a business may be able to predictably order toilet paper at opportune times of the week, month, or year. By dynamically monitoring toilet paper demand, a business can have a consistent supply of toilet paper.

In some embodiments, a system includes a local device and a remote computing system. The local device is disposed in a toilet paper dispenser and includes a sensor and a first processor. The sensor is configured to measure a distance to a toilet paper roll. The first processor is configured to calculate, using the measured distance to the toilet paper roll, a percentage of toilet paper remaining on the toilet paper roll. The first processor is further configured to transmit, when it is determined that the percentage of toilet paper remaining is less than a minimum threshold, sensor data across a wireless communications network. The remote computing system includes a second processor configured to receive the sensor data and send an alert for display on a user device in response to receiving the sensor data.

The disclosed embodiments provide several practical applications and technical advantages, which include at least: 1) technology that utilizes a local device disposed inside a toilet paper dispenser to measure and report the amount of toilet paper remaining on a toilet paper roll; 2) technology that automatically provides alerts for display on a user device when a measured percentage of toilet paper remaining on a toilet paper roll is below a predetermined minimum threshold; and 3) technology that automatically provides alerts for display on a user device when the difference between a current amount of toilet paper on a toilet paper roll and a previous amount of toilet paper on the toilet paper roll exceeds a threshold amount of change in toilet paper.

Certain embodiments may include none, some, or all of the above technical advantages and practical applications. One or more other technical advantages and practical applications may be readily apparent to one skilled in the art from the figures, descriptions, and claims included herein.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
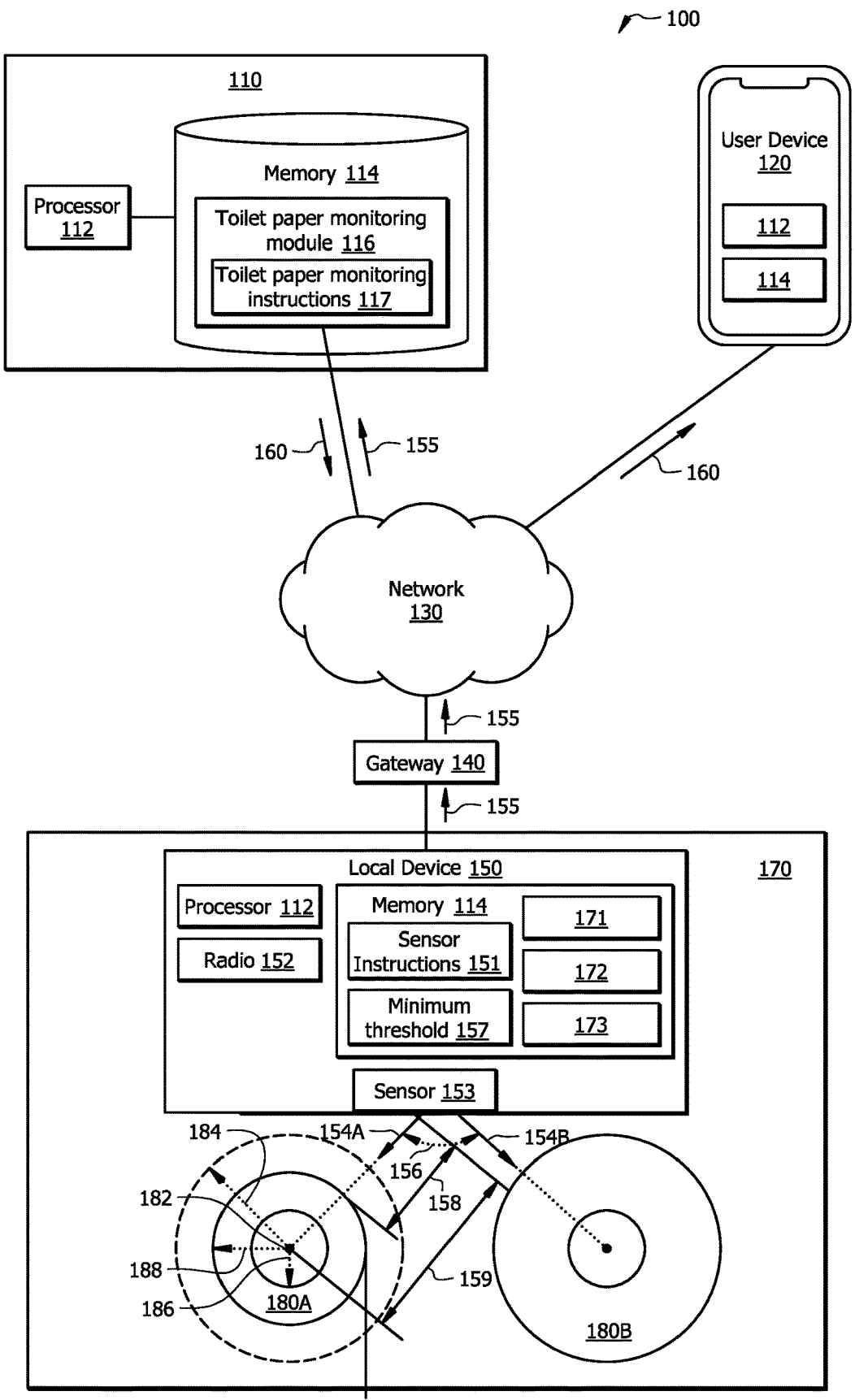
FIG. 1 is a schematic diagram of a toilet paper monitoring system, according to certain embodiments.
Figure 2:
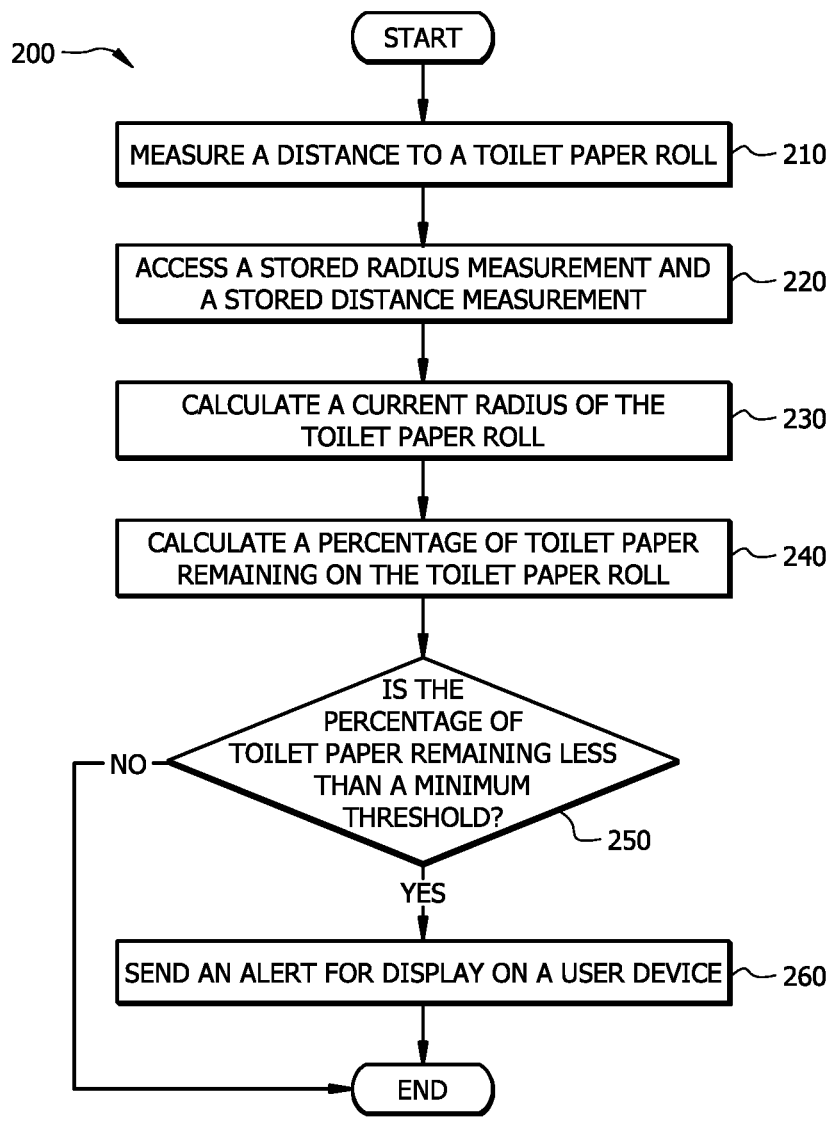
FIG. 2 is a flowchart of a method for monitoring a toilet paper roll, according to certain embodiments.
Figure 3:
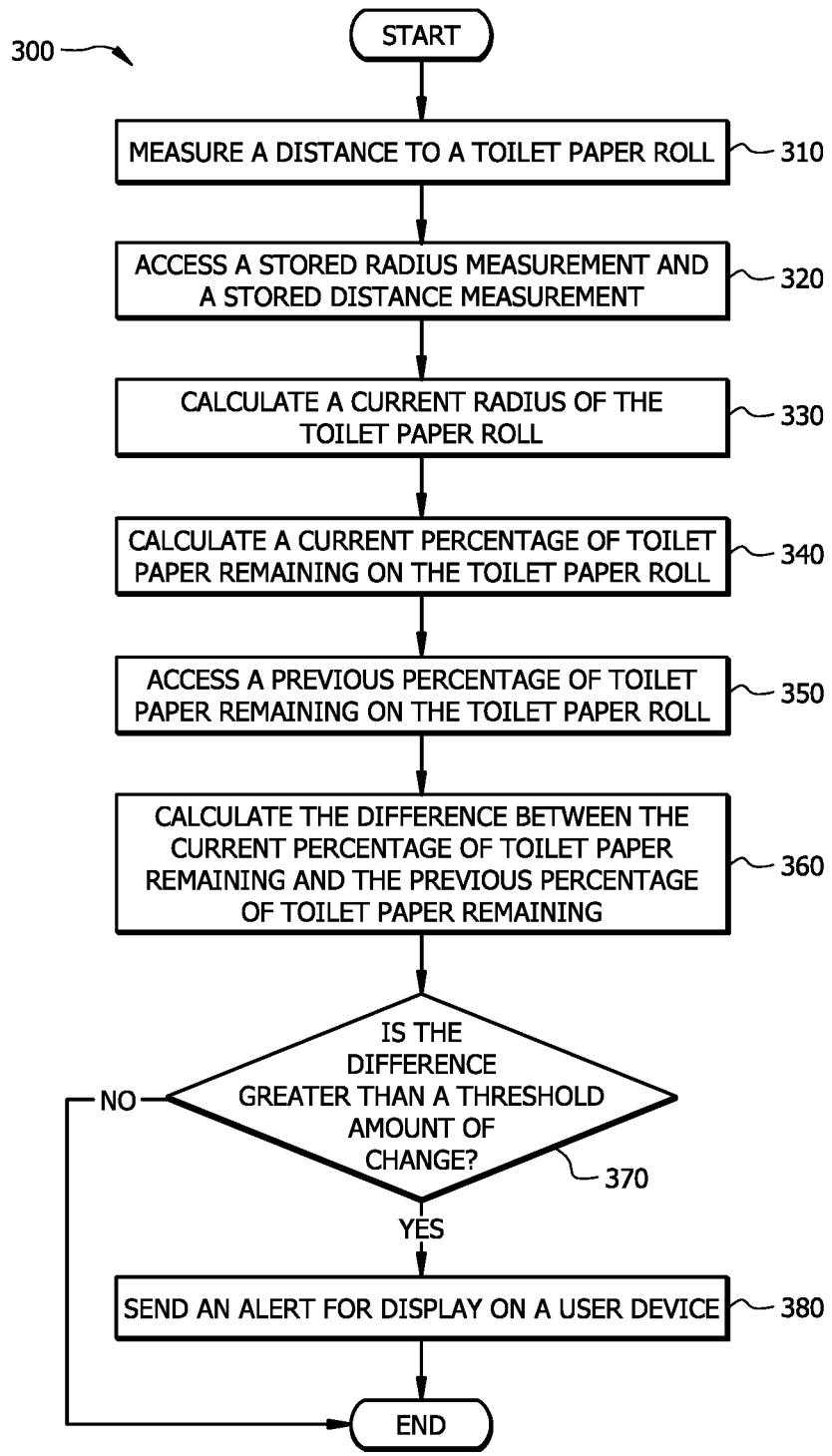
FIG. 3 is a flowchart of another method for monitoring a toilet paper roll, according to certain embodiments

Embodiments of the present disclosure and its advantages are best understood by referring to FIGS. 1 through 3 of the drawings, like numerals being used for like and corresponding parts of the various drawings.

Toilet paper dispensers are utilized by most businesses such as convenience stores. Toilet paper dispensers store and dispense one or more rolls of toilet paper. Due to the configuration and materials of most toilet paper dispensers, it may be difficult or otherwise time consuming for workers to determine how much toilet paper is remaining on toilet paper rolls disposed within a toilet paper dispenser.

To address these and other problems associated with toilet paper rolls and dispensers, this disclosure contemplates measuring a toilet paper roll with a sensor, such as a time-of-flight (ToF) sensor, in order to determine how much toilet paper is remaining on the roll and then creating an alert for display on a user device based on the amount of toilet paper remaining. In one example, an alert may be displayed on a user device when a measured percentage of toilet paper remaining on a toilet paper roll is below a predetermined minimum threshold (e.g., less than 10% of the roll remaining). In another example, an alert may be displayed on a user device when it is determined that the difference between a current amount of toilet paper on a toilet paper roll and a previous amount of toilet paper on the toilet paper roll exceeds a threshold amount of change in toilet paper (e.g., the amount of toilet paper on the roll decreased by more than 60% from the previous measurement). As a result, workers in businesses such as convenience stores may be automatically notified when a toilet paper rolls needs to be changed, thereby increasing worker productivity and customer satisfaction. Furthermore, by monitoring toilet paper consumption over time, a business may be able to predictably order toilet paper at opportune times of the week, month, or year. By dynamically monitoring toilet paper demand to optimize toilet paper supply chain orders, a business can have a consistent supply of toilet paper.

FIG. 1 illustrates an example toilet paper monitoring system 100, according to certain embodiments. As illustrated in FIG. 1, certain embodiments of toilet paper monitoring system 100 include a remote computing system 110, a user device 120, a network 130, a gateway 140, and a local device 150. Remote computing system 110 is communicatively coupled to user device 120 and gateway 140 via a network 130 using any appropriate wired or wireless telecommunication technology. Local device 150 is disposed either partially or fully within a toilet paper dispenser 170. In some embodiments, local device 150 sends sensor data 155 directly to remote computing system 110 or indirectly to remote computing system 110 via network 130 using any appropriate wired or wireless telecommunication technology (i.e., without using gateway 140). In other embodiments, local device 150 sends sensor data 155 to gateway 140 using an Internet-of-Things (IoT) communications protocol, and gateway 140 in turns sends sensor data 155 to remote computing system 110 via network 130. Sensor data 155 may include one or more distances to a toilet paper roll 180 measured by a sensor of local device 150 (e.g., sensor 153) or data associated with the status of toilet paper roll 180 (e.g., how much toilet paper is remaining on toilet paper roll 180, whether the amount of toilet paper remaining on toilet paper roll 180 is below a certain threshold, whether the amount of toilet paper on toilet paper roll 180 has changed more than a threshold amount, etc.).

In general, toilet paper monitoring system 100 provides alerts 160 about toilet paper roll 180 based on sensor data 155 from local device 150 that is disposed within toilet paper dispenser 170. In some embodiments, remote computing system 110 sends alert 160 for display on user device 120 when a measured percentage of toilet paper remaining on toilet paper roll 180 is below a predetermined minimum threshold. As a specific example, alert 160 may be displayed on user device 120 when the percentage of toilet paper remaining on toilet paper roll 180 is below 10% of a full roll of toilet paper. In other embodiments, remote computing system 110 sends alert 160 for display on user device 120 when the difference between a current amount of toilet paper on toilet paper roll 180 and a previous amount of toilet paper on toilet paper roll 180 exceeds a threshold amount of change in toilet paper. As a specific example, alert 160 may be displayed on user device 120 when the amount of toilet paper on toilet paper roll 180 decreased by more than 50% from the previous measurement.

A technical advantage of some embodiments is that local device 150 can be used to continuously monitor a percentage of toilet paper used, as opposed to merely a binary determination of whether there is or is not any toilet paper available. The continuous measurement is tunable to a certain level of desired precision based on the selected sensor within local device 150 (i.e., sensor 153) and the radius of toilet paper roll 180. For example, if it is desired to only measure to a 10% change in total radius of toilet paper roll 180, then a particular sensor with that level of sensitivity can be used in local device 150. However, if it is desired to measure a 1% change in total radius of toilet paper roll 180, then a more sensitive sensor can be used in local device 150 to achieve that level of sensitivity. To conserve processing, memory, and networking resources, a particular sensor can be selected that will have a lower degree of precision but still a continuous measurement versus a binary measurement. This may reduce the number of reporting signals, which reduces the consumption of hardware resources such as processor, memory, and network resources.

Remote computing system 110 may be any appropriate computing system in any suitable physical form. As example and not by way of limitation, remote computing system 110 may be an embedded computer system, a system-on-chip (SOC), a single-board computer system (SBC) (such as, for example, a computer-on-module (COM) or system-on-module (SOM)), a desktop computer system, a laptop or notebook computer system, a mainframe, a mesh of computer systems, a mobile telephone, a personal digital assistant (PDA), a server, a tablet computer system, an augmented/virtual reality device, or a combination of two or more of these. Where appropriate, remote computing system 110 may include one or more remote computing systems 110; be unitary or distributed; span multiple locations; span multiple machines; span multiple data centers; or reside in a cloud, which may include one or more cloud components in one or more networks. Where appropriate, one or more remote computing systems 110 may perform without substantial spatial or temporal limitation one or more steps of one or more methods described or illustrated herein. As an example and not by way of limitation, one or more remote computing systems 110 may perform in real time or in batch mode one or more steps of one or more methods described or illustrated herein. One or more remote computing systems 110 may perform at different times or at different locations one or more steps of one or more methods described or illustrated herein, where appropriate. In some embodiments, remote computing system 110 includes an electronic display that may alternately or additionally display alert 160.

Remote computing system 110 may be physically located within the same physical building in which local device 150 is located, or physically located at a location remote from the physical building in which local device 150 is located. For example, in certain embodiments, remote computing system 110 may located in one or more remote servers (e.g. in the cloud).

Processor 112 is any electronic circuitry, including, but not limited to a microprocessor, an application specific integrated circuits (ASIC), an application specific instruction set processor (ASIP), and/or a state machine, that communicatively couples to memory 114 and controls the operation of remote computing system 110. Processor 112 may be 8-bit, 16-bit, 32-bit, 64-bit or of any other suitable architecture. Processor 112 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 112 may include other hardware that operates software to control and process information. Processor 112 executes software stored in memory to perform any of the functions described herein. Processor 112 controls the operation and administration of remote computing system 110 by processing information received from local device 150, gateway 140, network 130, user device 120, and memory 114. Processor 112 may be a programmable logic device, a microcontroller, a microprocessor, any suitable processing device, or any suitable combination of the preceding. Processor 112 is not limited to a single processing device and may encompass multiple processing devices.

Memory 114 may store, either permanently or temporarily, data such as sensor data 155, user preferences, operational software such as toilet paper monitoring module 116, or other information for processor 112. Memory 114 may include any one or a combination of volatile or non-volatile local or remote devices suitable for storing information. For example, memory 114 may include random access memory (RAM), read only memory (ROM), magnetic storage devices, optical storage devices, or any other suitable information storage device or a combination of these devices.

Toilet paper monitoring module 116 represents any suitable set of instructions, logic, or code embodied in a computer-readable storage medium. For example, toilet paper monitoring module 116 may be embodied in memory 114, a disk, a CD, or a flash drive. In particular embodiments, toilet paper monitoring module 116 may include toilet paper monitoring instructions 117 (e.g., a software application) executable by processor 112 to perform one or more of the functions described herein. In general, toilet paper monitoring module 116 sends alert 160 for display on user device 120 either directly or via network 130. As described in more detail herein, alerts 160 are generated by toilet paper monitoring module 116 based on sensor data 155 from local device 150.

User device 120 is any appropriate device for communicating with components of remote computing system 110 over network 130. For example, user device 120 may be a handheld computing device such as a smartphone, wearable computer glasses, a smartwatch, a tablet computer, a laptop computer, and the like. User device 120 may include an electronic display, a processor such as processor 112, and memory such as memory 114. The electronic display of user device 120 may display an alert 160 that is provided by remote computing system 110.

Network 130 allows communication between and amongst the various components of system 100. For example, remote computing system 110, user device 120, and gateway 140 may communicate via network 130. This disclosure contemplates network 130 being any suitable network operable to facilitate communication between the components of system 100. Network 130 may include all or a portion of a local area network (LAN), a wide area network (WAN), an overlay network, a software-defined network (SDN), a virtual private network (VPN), a packet data network (e.g., the Internet), a mobile telephone network (e.g., cellular networks, such as 4G or 5G), a Plain Old Telephone (POT) network, a wireless data network (e.g., WiFi, WiGig, WiMax, etc.), a Long Term Evolution (LTE) network, a Universal Mobile Telecommunications System (UMTS) network, a peer-to-peer (P2P) network, a Bluetooth network, a Near Field Communication (NFC) network, a Zigbee network, and/or any other suitable network.

Local device 150 is a computing device that is housed either partially or wholly within toilet paper dispenser 170. In some embodiments, local device 150 includes a processor 112, memory 114, a radio 152, and one or more sensors 153. In general, local device 150 provides sensor data 155 to remote computing system 110 regarding toilet paper roll 180. Various embodiments of sensor data 155 are described in more detail below.

In some embodiments, local device 150 is an IoT sensor. In general, IoT describes a network of physical objects that are embedded with sensors, software, and other technologies for the purpose of connecting and exchanging data with other devices and systems over the Internet. For example, some embodiments of local device 150 include a microprocessor (e.g., processor 112), a transceiver (e.g., radio 152) for wirelessly communicating sensor data 155 (e.g., via an IoT communications protocol), an antenna, and a power supply such as a battery. In embodiments where local device 150 is an IoT device, toilet paper monitoring system 100 may include gateway 140 for communicating with local device 150. Gateway 140 may be any appropriate IoT gateway, computer system, or electronic device that is capable of wirelessly communicating with local device 150 using any appropriate IoT communications protocol (e.g., Message Queuing Telemetry Transport (MQTT), Constrained Application Protocol (CoAP), Advanced Message Queuing Protocol (AMQP), Data Distribution Service (DDS), HyperText Transfer Protocol (HTTP), WiFi, Bluetooth, ZigBee, Z-Wave, a media access control (MAC) protocol such as LoRaWAN, and the like). For example, local device 150 may wirelessly transmit sensor data 155 to gateway 140, and gateway 140 may in turn send sensor data 155 to remote computing system 110 via network 130. In other embodiments, local device 150 is not an IoT device. In embodiments where local device 150 is not an IoT device, local device 150 does not utilize gateway 140 but instead transmits sensor data 155 directly to remote computing system 110 or indirectly via network 130 (e.g., via Bluetooth or WiFi).

Local device instructions 151 represents any suitable set of instructions, logic, or code embodied in a computer-readable storage medium. For example, local device instructions 151 may be embodied in memory 114 of local device 150, a disk, a CD, or a flash drive. In particular embodiments, local device instructions 151 may include a software application executable by processor 112 of local device 150 to perform one or more of the functions described herein. In general, local device instructions 151 sends sensor data 155 to remote computing device 110 either directly, indirectly via network 130, or indirectly via gateway 140.

Radio 152 is any transmitter or transceiver that is capable of wirelessly transmitting sensor data 155. In some embodiments, for example, radio 152 is a Bluetooth transceiver. In these embodiments, sensor data 155 is transmitted via Bluetooth to either gateway 140 or remote computing system 110. In other embodiments, radio 152 is a Wi-Fi transceiver and sensor data 155 is transmitted via Wi-Fi to either gateway 140 or remote computing system 110.

Sensor 153 is any device for sensing or measuring the physical distance to an object. In some embodiments, sensor 153 may be a ToF sensor that utilizes a laser to produce a beam of infrared light that is bounced off an object and returned to the sensor 153 in order to measure distance to the object. In these embodiments, sensor 153 may include a laser diode and a photodetector. For example, a laser diode of sensor 153 may produce a laser beam 154 at a predetermined frequency that travels towards toilet paper roll 180, is reflected off of toilet paper roll 180, and travels back to sensor 153 where it is detected by the photodetector of sensor 153. The photodetector of sensor 153 may be any appropriate device that can detect each reflected laser beam 154. In some embodiments, processor 112 may be communicatively coupled to the laser diode of sensor 153 and to the photodetector of sensor 153. Processor 112 of local device 150 (or, in other embodiments, a processor within sensor 153) determines a distance 158 to toilet paper roll based on a difference in time between production of the laser beam 154 by the laser diode of sensor 153 and reception of the reflected laser beam 154 by the photodetector of sensor 153.

In some embodiments, laser beam 154 generated by sensor 153 is coincident with a radial line that extends from the laser of sensor 153 to a center 182 of toilet paper roll 180. For example, laser beam 154A is coincident with a radial line that extends from the laser of sensor 153 to center 182 of toilet paper roll 180A. In some embodiments, toilet paper dispenser 170 includes two toilet paper rolls 180 (i.e., toilet paper rolls 180A-B). In such embodiments, sensor 153 may include two laser diodes that generate two separate laser beams 154A-B that are separated by an angle 156 (e.g., 90 degrees). In these embodiments, second laser beam 154B generated by sensor 153 is coincident with a radial line that extends from the second laser of sensor 153 to center 182 of toilet paper roll 180B.

In general, local device 150 provides sensor data 155 to remote computing system 110 that is used to generate alert 160. In some embodiments, sensor data 155 is the raw distance to toilet paper roll 158 as measured by sensor 153, which may be any appropriate distance value (e.g., inches or millimeters). In these embodiments, the calculations described herein regarding toilet paper roll 180 are performed by remote computing system 110. In other embodiments, local device 150 performs the calculations described herein regarding toilet paper roll 180, and sensor data 155 includes the calculations performed on distance to toilet paper roll 158 by local device 150. For example, sensor data 155 may include a percentage of toilet paper remaining on toilet paper roll 180 that is calculated by local device 150 using distance to toilet paper roll 158. In summary, the calculations described herein regarding toilet paper roll 180 using distance to toilet paper roll 158 may be performed by either remote computing system 110 or local device 150 (or, in some embodiments, a combination of local device 150 and remote computing system 110).

In some embodiments, sensor data 155 is provided automatically by local device 150 at periodic intervals (e.g., every five minutes). In other embodiments, sensor data 155 is provided by local device 150 when requested by remote computing system 110. In yet other embodiments, in order to conserve power, sensor data 155 is provided by local device 150 only when certain conditions regarding toilet paper roll 180 are met (e.g., local device 150 may only send sensor data 155 once the percentage of toilet paper remaining on toilet paper roll 180 falls below minimum threshold 157).

Alert 160 is a message or other indication that is displayed on user device 120 regarding toilet paper roll 180. In some embodiments, alert 160 includes one or more of an indication of toilet paper roll 180, a timestamp associated with toilet paper roll 180, a location, a percentage of toilet paper remaining on toilet paper roll 180, and an amount of change in the amount of toilet paper remaining on toilet paper roll 180. For example, alert 160 may be: "The toilet paper in Bathroom A has less than 10% remaining at 10:20 AM." As another example, alert 160 may be: "The toilet paper in Bathroom C has decreased by more than 50%."

Toilet paper dispenser 170 is any physical housing that holds one or more toilet paper rolls 180. For example, as illustrated in FIG. 1, toilet paper dispenser 170 may hold two toilet paper rolls 180. In other embodiments, however, toilet paper dispenser 170 may hold only a single toilet paper roll 180. Toilet paper roll 180 may have any appropriate dimensions. A full toilet paper roll 180B (i.e., a new toilet paper roll 180 that has not been used) has a full radius 184, and an empty toilet paper roll 180 (i.e., a toilet paper roll 180 that has been completely used) has an empty radius 186. A partially-used toilet paper roll 180A has a current radius 188, which may be calculated using distance to toilet paper roll 158, as described in more detail below.

In operation, remote computing system 110 provides alerts 160 for display on user device 120 based on sensor data 155. Generally, remote computing system 110 generates alerts 160 in response to two situations: 1) when a measured percentage of toilet paper remaining on toilet paper roll 180 is below a predetermined minimum threshold 157, and 2) when the amount of toilet paper on toilet paper roll 180 has changed by more than a threshold amount of change in toilet paper. Each situation is described in more detail below.

First, certain embodiments generate alert 160 for display on user device 120 when a measured percentage of toilet paper remaining on toilet paper roll 180 is below a predetermined minimum threshold 157 (e.g., a static value such as 10%). To calculate the percentage of toilet paper remaining on toilet paper roll 180, local device 150 may first access a stored radius measurement that indicates a radius of toilet paper roll 180 when toilet paper roll 180 is full of toilet paper (i.e., full radius 184). Full radius 184 may be stored in memory 114 and may be configurable by a user. Local device 150 may also access a stored distance measurement that indicates a total distance from sensor 153 to center 182 of toilet paper roll 180 (i.e., distance to center 159). Distance to center 159 may be stored in memory 114 and may be configurable by a user. Local device 150 then calculates a current radius 188 of toilet paper roll 180 by subtracting distance to toilet paper roll 158 from distance to center 159. Finally, local device 150 calculates a current percentage 171 of toilet paper remaining on toilet paper roll 180 as a ratio of the current radius 188 to full radius 184. If the calculated current percentage 171 of toilet paper remaining on toilet paper roll 180 is less than minimum threshold 157, toilet paper monitoring system 100 generates alert 160 to indicate to a worker that toilet paper roll 180 needs to be replaced. In some embodiments, the calculated current percentage 171 of toilet paper remaining on toilet paper roll 180 is stored in memory 114 of local device 150 or remote computing system 110.

Second, certain embodiments generate alert 160 for display on user device 120 when the amount of toilet paper on toilet paper roll 180 has changed by more than a threshold amount of change 172 in toilet paper. In general, alert 160 is provided in these situations in order to alert a worker that the amount of toilet paper on toilet paper roll 180 has recently decreased by a large amount. For example, alert 160 may be generated if the amount of toilet paper on toilet paper roll 180 has recently decreased by over 50%. An alert 160 for such a decrease may allow a worker to take proactive action to restock toilet paper roll 180. In these embodiments, local device 150 first calculates a current percentage 171 of toilet paper remaining on toilet paper roll 180 as described above. Next, local device 150 accesses a previously-calculated percentage 172 of toilet paper remaining on toilet paper roll 180 stored in memory 114. Next, local device 150 calculates a difference between the current percentage of toilet paper remaining on toilet paper roll 180 and the previous percentage of toilet paper remaining on toilet paper roll 180. Local device 150 then accesses a threshold amount of change 173 in toilet paper stored in memory 114 and compares the calculated difference between the current percentage 171 of remaining toilet paper and the previous percentage 172 of remaining toilet paper to the threshold amount of change 173 in toilet paper. When the difference between the current percentage 171 of toilet paper remaining on toilet paper roll 180 and the previous percentage 172 of toilet paper remaining on toilet paper roll 180 exceeds the threshold amount of change 173 in toilet paper, toilet paper monitoring system 100 generates alert 160 to indicate to a worker that the amount of toilet paper on toilet paper roll 180 has recently changed by a large amount. In some embodiments, when the difference between the current percentage 171 of toilet paper remaining on toilet paper roll 180 and the previous percentage 172 of toilet paper remaining on toilet paper roll 180 exceeds the threshold amount of change 173 in toilet paper, toilet paper monitoring system 100 may send one or more instructions to dispense air freshener in the room in which local device 150 is physically located.

While certain calculations regarding toilet paper roll 180 are described above with respect to local device 150, it should be understood that, in other embodiments, remote computing system 110 may perform some or all of the calculations regarding toilet paper roll 180 instead of local device 150. In embodiments where local device 150 performs calculations regarding toilet paper roll 180, local device 150 disposed in toilet paper dispenser 170 measures a distance to toilet paper roll 158 using sensor 153, uses the measured distance to toilet paper roll 158 for the various calculations regarding toilet paper roll 180 described herein, and then sends the calculations via sensor data 155 to remote computing system 110. In embodiments where remote computing system 110 performs calculations regarding toilet paper roll 180, remote computing system 110 receives or otherwise accesses distance to toilet paper roll 158 as measured by sensor 153 and then uses measured distance to toilet paper roll 158 for the various calculations regarding toilet paper roll 180 described herein.

Certain embodiments of local device 150 utilize various techniques to reduce power consumption of local device 150. For example, certain embodiments of local device 150 only transmit sensor data 155 when certain conditions are met (e.g., when a measured percentage of toilet paper remaining on toilet paper roll 180 is below a predetermined minimum threshold 157 or when the amount of toilet paper on toilet paper roll 180 has changed by more than a threshold amount of change in toilet paper). In some embodiments, local device 150 remains in a low power consumption "sleep" mode for extended periods of time. While in sleep mode, local device 150 consumes less power by reducing or avoiding using components such as radio 152 and sensor 153. In these embodiments, local device 150 may wake from the sleep mode after a predetermined amount of time (e.g., every five minutes), measure distance to toilet paper roll 158 and possibly perform calculations regarding toilet paper roll 180, transmit sensor data 155 to remote computing system 110 or gateway 140, and then return to sleep mode after transmitting sensor data 155. As a result, embodiments of local device 150 that utilize batteries for power may be able to operate for a longer duration of time before requiring new batteries.

In certain embodiments, user device 120 may receive sensor data 155 directly from local device 150 and then use sensor data 155 to perform the operations described above with respect to remote computing system 110. That is, user device 120 may be used to analyze sensor data 155 from local device 150 and then display alerts 160 without instructions or interaction from remote computing system 110. In such embodiments, toilet paper monitoring module 116 is stored in memory of user device 120 instead of remote computing system 110.

In certain embodiments, user device 120 may receive sensor data 155 generated by local device 150 and use sensor data 155 to provide alerts 160 for display on user device 120. In these embodiments, local device 150 may directly communicate with user device 120 instead of with remote computing system 110. For example, in such embodiments, memory 114 of user device 120 may include instructions (e.g., toilet paper monitoring module 116) that, when executed by a processor 112 of user device 120, enable user device 120 to monitor sensor data 155 in order to provide alerts 160 for display on user device 120 based on sensor data 155, as described herein. For example, instructions stored in memory 114 of user device 120 may generate alert 160 for display on user device 120 when a measured percentage of toilet paper remaining on toilet paper roll 180 is below a predetermined minimum threshold 157.

FIG. 2 illustrates a method 200 for monitoring a toilet paper roll, according to certain embodiments. In general, method 200 may be utilized by local device 150 and remote computing system 110 to automatically provide alert 160 for display on user device 120. Method 200 may begin at operation 210 where method 200 measures a distance to a toilet paper roll. In some embodiments, operation 210 includes using a ToF sensor such as sensor 153 disposed in a toilet paper dispenser to measure the distance to the toilet paper roll. In some embodiments, the sensor includes a laser that is configured to generate a laser beam coincident with a radial line that extends from the laser to a center of the toilet paper roll.

At operation 220, method 200 accesses a stored radius measurement and a stored distance measurement. The stored radius measurement indicates a radius of the toilet paper roll when the toilet paper roll is full of toilet paper. In some embodiments, the stored radius measurement is full radius 184. The stored distance measurement indicates a total distance from the sensor to a center of the toilet paper roll. In some embodiments, the stored distance measurement is distance to center 159.

At operation 230, method 200 calculates a current radius of the toilet paper roll by subtracting the measured distance to the toilet paper of roll of operation 210 from the stored distance measurement of operation 220. At operation 240, method 200 calculates a percentage of toilet paper remaining on the toilet paper roll. In some embodiments, operation 240 includes calculating the percentage of toilet paper remaining on the toilet paper roll as a ratio of the current radius of operation 230 to the stored radius measurement of operation 220.

At operation 250, method 200 determines whether the percentage of toilet paper remaining on the toilet paper roll of operation 240 is less than a minimum threshold. In some embodiments, the minimum threshold is minimum threshold 157. If method 200 determines in operation 250 that the percentage of toilet paper remaining on the toilet paper roll of operation 240 is less than the minimum threshold, method 200 proceeds to operation 260. If method 200 determines in operation 250 that the percentage of toilet paper remaining on the toilet paper roll of operation 240 is greater than or equal to the minimum threshold, method 200 may end.

At operation 260, method 200 sends an alert for display on a user device when it is determined in operation 250 that the percentage of toilet paper remaining is less than the minimum threshold. In some embodiments, the alert is alert 160. In some embodiments, the alert indicates that the amount of toilet paper remaining on a toilet paper roll is below a predetermined minimum threshold. After operation 260, method 200 may end.

FIG. 3 illustrates a method 300 for monitoring a toilet paper roll, according to certain embodiments. While method 200 of FIG. 2 above generates an alert when the percentage of toilet paper remaining on a toilet paper roll is less than a minimum threshold, method 300 of FIG. 3 generates an alert when the amount of toilet paper on a toilet paper roll has changed by more than a threshold amount of change in toilet paper. Method 300 may begin at operation 310 where method 300 measures a distance to a toilet paper roll. In some embodiments, operation 310 includes using a ToF sensor, such as sensor 153, disposed in a toilet paper dispenser to measure the distance to the toilet paper roll.

At operation 320, method 300 accesses a stored radius measurement and a stored distance measurement. The stored radius measurement indicates a radius of the toilet paper roll when the toilet paper roll is full of toilet paper. In some embodiments, the stored radius measurement is full radius 184. The stored distance measurement indicates a total distance from the sensor to a center of the toilet paper roll. In some embodiments, the stored distance measurement is distance to center 159.

At operation 330, method 300 calculates a current radius of the toilet paper roll by subtracting the measured distance to the toilet paper of roll of operation 310 from the stored distance measurement of operation 320. At operation 340, method 300 calculates a current percentage of toilet paper remaining on the toilet paper roll. In some embodiments, operation 340 includes calculating the current percentage of toilet paper remaining on the toilet paper roll as a ratio of the current radius of operation 330 to the stored radius measurement of operation 320.

At operation 350, method 300 accesses a previous percentage of toilet paper remaining on the toilet paper roll. In some embodiments, the previous percentage of toilet paper remaining on the toilet paper roll is previously-calculated percentage 172 of toilet paper remaining.

At operation 360, method 300 calculates the difference between the current percentage of toilet paper remaining of operation 340 and the previous percentage of toilet paper remaining of operation 350. At operation 370, method 300 determines whether the difference between the current percentage of toilet paper remaining and the previous percentage of toilet paper remaining calculated in operation 360 is greater than a threshold amount of change. In some embodiments, the threshold amount of change is threshold amount of change 173. If method 300 determines in operation 370 that the difference between the current percentage of toilet paper remaining and the previous percentage of toilet paper remaining is greater than the threshold amount of change, method 300 proceeds to operation 380. Otherwise, method 300 may end.

At operation 380, method 300 sends an alert for display on a user device when it is determined in operation 370 that the difference between the current percentage of toilet paper remaining and the previous percentage of toilet paper remaining is greater than the threshold amount of change. In some embodiments, the alert is alert 160. In some embodiments, the alert indicates the amount of toilet paper on a toilet paper roll has changed more than a threshold amount (e.g., the amount of toilet paper has decreased by more than 50% from the previous measurement). In some embodiments, operation 380 may additionally include sending one or more instructions to dispense air freshener. After operation 380, method 300 may end.

Modifications, additions, or omissions may be made to the methods described herein without departing from the scope of the disclosure. The methods may include more, fewer, or other operations. Additionally, operations may be performed in any suitable order. That is, the operations of any method disclosed herein do not have to be performed in the exact order disclosed, unless explicitly stated.

As used in this document, "each" refers to each member of a set or each member of a subset of a set. Furthermore, as used in the document "or" is not necessarily exclusive and, unless expressly indicated otherwise, can be inclusive in certain embodiments and can be understood to mean "and/or." Similarly, as used in this document "and" is not necessarily inclusive and, unless expressly indicated otherwise, can be inclusive in certain embodiments and can be understood to mean "and/or." All references to "a/an/the element, apparatus, component, means, step, etc." are to be interpreted openly as referring to at least one instance of the element, apparatus, component, means, step, etc., unless explicitly stated otherwise.

Furthermore, reference to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

The embodiments disclosed herein are only examples, and the scope of this disclosure is not limited to them. Particular embodiments may include all, some, or none of the components, elements, features, functions, operations, or steps of the embodiments disclosed herein. Certain embodiments are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

What is claimed is:

1. A system comprising:
   a local device disposed in a toilet paper dispenser, the local device comprising:
     a sensor configured to measure a distance from the sensor to a surface of a toilet paper roll; and
     a first processor configured to:
       calculate, using the measured distance to the toilet paper roll, a percentage of toilet paper remaining on the toilet paper roll, wherein the calculating comprises:

obtaining a stored radius measurement that indicates a radius of the toilet paper roll when the toilet paper roll is full of toilet paper;
obtaining a stored distance measurement that indicates a total distance from the sensor to a center of the toilet paper roll;
calculating a current radius of the toilet paper roll by subtracting the measured distance to the toilet paper roll from the stored distance measurement; and
calculating the percentage of toilet paper remaining on the toilet paper roll as a ratio of the current radius to the stored radius measurement; and
transmit, when it is determined that the percentage of toilet paper remaining is less than a minimum threshold, sensor data across a wireless communications network; and
a remote computing system comprising a second processor configured to:
receive the sensor data; and
send an alert for display on a user device in response to receiving the sensor data.

2. The system of claim 1, further comprising a second sensor, wherein the first processor is further configured to:
measure, using the second sensor, a distance to a second toilet paper roll;
calculate, using the measured distance to the second toilet paper roll, a percentage of toilet paper remaining on the second toilet paper roll; and
transmit, when it is determined that the percentage of toilet paper remaining on the second toilet paper roll is less than the minimum threshold, sensor data across the wireless communications network.

3. The system of claim 1, wherein the sensor is a time-of-flight sensor that comprises a laser configured to generate a laser beam coincident with a radial line that extends from the laser to a center of the toilet paper roll.

4. The system of claim 1, wherein:
the sensor comprises:
a laser operable to produce a beam of infrared light; and
a photodetector operable to detect the beam of light after the beam of light has reflected off the toilet paper roll; and
measuring the distance to the toilet paper roll comprises measuring a difference in time between production of the beam of infrared light by the laser and reception of the reflected beam of light by the photodetector.

5. The system of claim 1, wherein the first processor is further configured to:
access a previously-calculated percentage of toilet paper remaining on the toilet paper roll;
calculate a difference between the calculated percentage of toilet paper remaining on the toilet paper roll and the previously-calculated percentage of toilet paper remaining on the toilet paper roll;
access a threshold amount of change in toilet paper; and
transmit, when the difference between the calculated percentage of toilet paper remaining on the toilet paper roll and the previously-calculated percentage of toilet paper remaining on the toilet paper roll exceeds the threshold amount of change in toilet paper, the sensor data across the wireless communications network.

6. The system of claim 1, wherein:
the local device is an Internet-of-Things device;
the local device wirelessly transmits the sensor data to a gateway using an Internet-of-Things communications protocol; and
the gateway transmits the sensor data to the remote system.

7. A method comprising:
measuring, using a sensor disposed in a toilet paper dispenser, a distance from the sensor to a surface of a toilet paper roll;
calculating, by one or more processors using the measured distance to the toilet paper roll, a percentage of toilet paper remaining on the toilet paper roll, wherein the calculating comprises:
obtaining a stored radius measurement that indicates a radius of the toilet paper roll when the toilet paper roll is full of toilet paper;
obtaining a stored distance measurement that indicates a total distance from the sensor to a center of the toilet paper roll;
calculating a current radius of the toilet paper roll by subtracting the measured distance to the toilet paper roll from the stored distance measurement; and
calculating the percentage of toilet paper remaining on the toilet paper roll as a ratio of the current radius to the stored radius measurement;
determining, by the one or more processors, whether the percentage of toilet paper remaining is less than a minimum threshold; and
sending, by the one or more processors, an alert for display on a user device when it is determined that the percentage of toilet paper remaining is less than the minimum threshold.

8. The method of claim 7, wherein the sensor is a time-of-flight device.

9. The method of claim 8, wherein the time-of-flight sensor comprises a laser configured to generate a laser beam coincident with a radial line that extends from the laser to a center of the toilet paper roll.

10. The method of claim 7, further comprising:
waking the sensor from a sleep mode after a predetermined amount of time; and
putting the sensor into the sleep mode after transmitting sensor data across a wireless communications network.

11. The method of claim 7, further comprising:
accessing a previously-calculated percentage of toilet paper remaining on the toilet paper roll;
calculating a difference between the calculated percentage of toilet paper remaining on the toilet paper roll and the previously-calculated percentage of toilet paper remaining on the toilet paper roll;
accessing a threshold amount of change in toilet paper; and
transmitting, when the difference between the calculated percentage of toilet paper remaining on the toilet paper roll and the previously-calculated percentage of toilet paper remaining on the toilet paper roll exceeds the threshold amount of change in toilet paper, the sensor data across the wireless communications network.

12. The method of claim 7, further comprising:
measuring, using a second sensor disposed in the toilet paper dispenser, a distance to a second toilet paper roll;
calculating, using the measured distance to the second toilet paper roll, a percentage of toilet paper remaining on the second toilet paper roll; and
transmitting, when it is determined that the percentage of toilet paper remaining on the second toilet paper roll is less than the minimum threshold, sensor data across the wireless communications network.

13. A system comprising:
a local device disposed in a toilet paper dispenser, the local device comprising:
a sensor configured to measure a distance from the sensor to a surface of a toilet paper roll; and
a first processor configured to transmit the measured distance to the toilet paper roll across a wireless communications network; and
a remote computing system comprising a second processor configured to:
receive the measured distance to the toilet paper roll from the local device;
calculate, using the measured distance to the toilet paper roll, a percentage of toilet paper remaining on the toilet paper roll, wherein the calculating comprises:
obtaining a stored radius measurement that indicates a radius of the toilet paper roll when the toilet paper roll is full of toilet paper;
obtaining a stored distance measurement that indicates a total distance from the sensor to a center of the toilet paper roll;
calculating a current radius of the toilet paper roll by subtracting the measured distance to the toilet paper roll from the stored distance measurement; and
calculating the percentage of toilet paper remaining on the toilet paper roll as a ratio of the current radius to the stored radius measurement; and
when it is determined that the percentage of toilet paper remaining is less than a minimum threshold, send an alert for display on a user device.

14. The system of claim 13, wherein the sensor is a time-of-flight sensor.

15. The system of claim 13, wherein the time-of-flight sensor comprises a laser configured to generate a laser beam coincident with a radial line that extends from the laser to a center of the toilet paper roll.

16. The system of claim 13, wherein the second processor is further configured to:
access a previously-calculated percentage of toilet paper remaining on the toilet paper roll;
calculate a difference between the calculated percentage of toilet paper remaining on the toilet paper roll and the previously-calculated percentage of toilet paper remaining on the toilet paper roll;
access a threshold amount of change in toilet paper; and
send another alert for display on the user device when it is determined that the difference between the calculated percentage of toilet paper remaining on the toilet paper roll and the previously-calculated percentage of toilet paper remaining on the toilet paper roll exceeds the threshold amount of change in toilet paper.

17. The system of claim 13, wherein:
the sensor is disposed in an Internet-of-Things device;
the Internet-of-Things device wirelessly transmits the sensor data to a gateway using an Internet-of-Things communications protocol; and
the gateway transmits the sensor data to the remote computing system.

18. The system of claim 13, wherein the first processor is further configured to:
wake the local device from a sleep mode after a predetermined amount of time; and
put the local device into the sleep mode after transmitting the measured distance across the wireless communications network.

* * * * *